(No Model.)

H. W. OSTER.
PIPE AND BOLT CUTTER.

No. 539,880. Patented May 28, 1895.

WITNESSES:
S. J. Cook,
T. H. Graham

INVENTOR:
H. W. Oster,
by Burridge + Cutter,
Attys.

THE NORRIS PETERS CO., PHOTO-LITHO., WASHINGTON, D. C.

UNITED STATES PATENT OFFICE.

HERMAN W. OSTER, OF CLEVELAND, OHIO, ASSIGNOR TO THE OSTER MANUFACTURING COMPANY, OF SAME PLACE.

PIPE AND BOLT CUTTER.

SPECIFICATION forming part of Letters Patent No. 539,880, dated May 28, 1895.

Application filed May 9, 1894. Serial No. 510,568. (No model.)

*To all whom it may concern:*

Be it known that I, HERMAN W. OSTER, a citizen of the United States, residing at Cleveland, in the county of Cuyahoga and State of Ohio, have invented certain new and useful Improvements in Pipe and Bolt Cutters, of which the following is a full, clear, and exact description.

My invention consists of a guide-bar, a cutter mounted thereon and reciprocated by means of a screw and a block having a post which engages an opening in said cutter, said bar being arranged to operate in an adjustable die-stock.

The object of my improvement is to provide a convenient device for cutting off pipes and bolts, after they have been threaded in a die-stock, although the cutter is entirely independent of the dies and may be employed without the same.

That my invention may be seen and fully understood by others, reference will be had to the following specification and annexed drawings forming a part thereof, in which—

Figure 1:
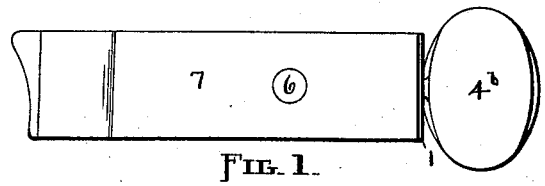
Figure 2:
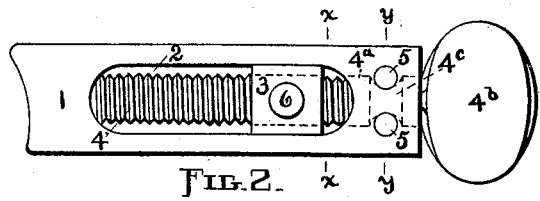
Figure 4:
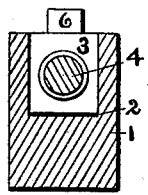
Figure 3:
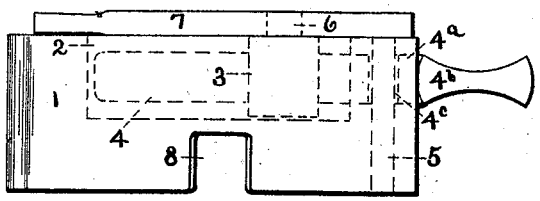
Figure 5:
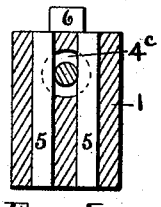

Figure 1 is a top view of my device; Fig. 2, a top view of the guide-bar, the cutter being removed; Fig. 3, a side view of said device; Fig. 4, a sectional view on lines $x\ x$, Fig. 2; Fig. 5, a sectional view on lines $y\ y$, Fig. 2; and Fig. 6, a plan view of an adjustable die-stock, showing the cutter thrown forward.

Similar figures of reference designate like parts in the drawings and specification.

The guide-bar 1 is provided with the slot or recess 2 in which the block 3 is reciprocated by means of the screw 4, said screw extending through said block. The screw 4 extends from the front end of the recess 2, through said recess lengthwise, terminating in the neck $4^a$ and the thumb-piece $4^b$. The thumb-piece $4^b$ is outside of the rear end of the bar 1 and the neck $4^a$ connects said piece with the screw 4. The neck $4^a$ is provided with the groove $4^c$, and the studs 5, 5 are driven securely into the bar 1, engaging said groove each side of said neck to prevent any reciprocating movement of the screw 4.

The top of the block 3 is flush with the upper side of the bar 1 and the post 6 projects above the upper surface of said block, in the center. The cutter 7 is of the same width as the bar 1 and has an opening to receive the post 6. The slot 8 is cut or cast in the underside of the bar 1.

It will now be readily seen that, by turning the screw 4 in one direction when the cutter 7 is in place on top of the bar 1, said cutter will be moved forward and, by turning said screw in the opposite direction, the cutter will be drawn back.

The guide-bar 1 is intended to operate in an adjustable die-stock, or its equivalent, and with the cutter 7 to fit closely a recess or passage in said stock.

Figure 6:
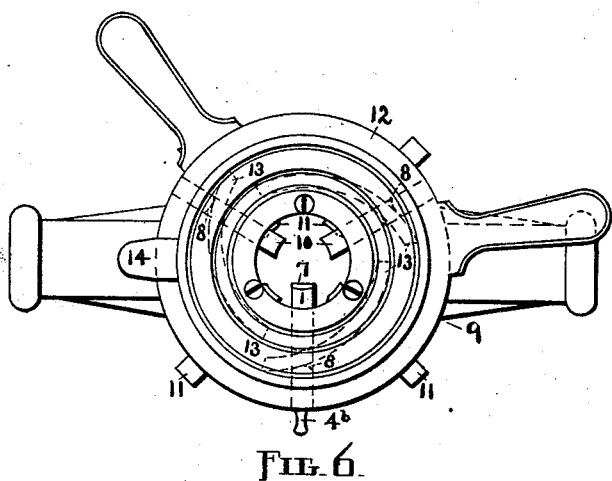

In Fig. 6, a die-stock 9 is shown, having the guide-bars 1, 10, 10, the dies 11, and the cam-plate 12. On the inner side of the plate 12 are cams indicated by the dotted lines 13 which engage the bar slots 8 and reciprocate the bars 1, 10, 10, when said plate is turned. The bars 1, 10, 10 are set to the diameter of the bolt or pipe to be cut, by turning the cam-plate 12, and then said plate is clamped or held rigidly by any suitable means and in turn secures said bars in position. By turning the thumb-piece $4^b$ so as to drive forward the cutter 7, said cutter is brought into contact with the bolt or pipe and operates on the same. The steady turning of the screw 4 forces the cutter 7 deeper and deeper into the metal of the bolt or pipe until the same is cut through. The screw 4 is now turned in the opposite direction until the edge of the cutter 7 is drawn back from the front end of the bar 1 and the tool is ready for another bolt or similar article. By removing the cam-plate 12, the bar 1 may be freely withdrawn and the cutter 7 slipped from the post 6, which is very convienient when it is desired to sharpen said cutter. The cutter 7 and bar 1 are as easily placed in position again in the stock 9.

I do not claim, in connection with this invention, the particular devices herein shown and described for reciprocating the bar 1, since any other suitable means may be employed for that purpose.

In place of the slot 8 in the bar 1 a pin may be used and cam slots substituted for the cams 13, in the plate 12.

In a large stock two bars 1 and cutters 7 may be employed to advantage and any number may be used without departing from the nature of my invention.

What I claim as my invention, and desire to secure by Letters Patent, is—

1. In a pipe and bolt cutter, the guide-bar 1 having therein the recess 2, the reciprocating block 3 in said recess flush with the top of said guide-bar provided with the post 6, and the studs 5, 5, in combination with the non-reciprocating screw 4 extending through said block and the rear end of said guide-bar and terminating at one end in the grooved neck $4^a$ and the thumb-piece $4^b$, said thumb-piece outside of the rear end of said guide-bar, said studs engaging the groove in said neck, substantially as and for the purpose set forth.

2. In a pipe and bolt cutter, the guide-bar 1 having therein the recess 2, the reciprocating block 3 in said recess flush with the top of said guide-bar provided with the post 6, the studs 5, 5 and the non-reciprocating screw 4 extending through said block and the rear end of said guide-bar and terminating at one end in the grooved neck $4^a$ and the thumb-piece $4^b$ outside of the rear end of said guide-bar, said studs engaging the groove in said neck, in combination with the cutter 7 of the same width as said guide-bar and provided with an opening to receive said post, substantially as and for the purpose set forth.

In testimony whereof I affix my signature in presence of two witness.

HERMAN W. OSTER.

Witnesses:
F. A. CUTTER,
P. APLEFELD.